(12) United States Patent
Charles

(10) Patent No.: US 8,820,840 B2
(45) Date of Patent: Sep. 2, 2014

(54) HEADREST FOR MOTOR VEHICLE SEAT

(75) Inventor: Philippe Charles, Luxeuil-les-Bains (FR)

(73) Assignee: Faurecia Sieges d'Automobile, Nanterre (FR)

( * ) Notice: Subject to any disclaimer, the term of this patent is extended or adjusted under 35 U.S.C. 154(b) by 557 days.

(21) Appl. No.: 13/094,471

(22) Filed: Apr. 26, 2011

(65) Prior Publication Data

US 2011/0266856 A1    Nov. 3, 2011

(30) Foreign Application Priority Data

Apr. 30, 2010  (FR) ...................... 10 53372

(51) Int. Cl.
*B60N 2/48* (2006.01)
*B60N 2/44* (2006.01)

(52) U.S. Cl.
CPC .............. *B60N 2/4802* (2013.01); *B60N 2/441* (2013.01); *B60N 2/4808* (2013.01)
USPC ........................................ 297/410; 297/391

(58) Field of Classification Search
USPC ................................. 297/391, 410
See application file for complete search history.

(56) References Cited

U.S. PATENT DOCUMENTS

| 3,979,150 | A | * | 9/1976 | Elzenbeck | 297/410 |
| 4,671,573 | A | * | 6/1987 | Nemoto et al. | 297/410 |
| 5,445,434 | A | * | 8/1995 | Kohut | 297/391 |
| 6,874,854 | B2 | * | 4/2005 | Terrand et al. | 297/410 |
| 2009/0243364 | A1 | * | 10/2009 | Brunner et al. | 297/408 |
| 2010/0270842 | A1 | * | 10/2010 | Mueller et al. | 297/410 |

FOREIGN PATENT DOCUMENTS

| EP | 0603136 A1 | 6/1994 |
| EP | 0743223 A2 | 11/1996 |
| GB | 2240920 A | 8/1991 |

OTHER PUBLICATIONS

French Search Report issued in FR10/53372 on Nov. 11, 2010.

* cited by examiner

*Primary Examiner* — David R Dunn
*Assistant Examiner* — Tania Abraham
(74) *Attorney, Agent, or Firm* — Vedder Price PC

(57) ABSTRACT

A headrest for a motor vehicle seat comprises at least one spindle for assembling the headrest in a backrest of the seat; and a body provided with at least one housing in the shape of a sleeve for receiving one end of said spindle, the spindle comprising, in an upper portion, a shoulder capable of cooperating with a horizontal rib, protruding inside of a housing of the body, to lock any translation of the spindle in its housing.

7 Claims, 5 Drawing Sheets

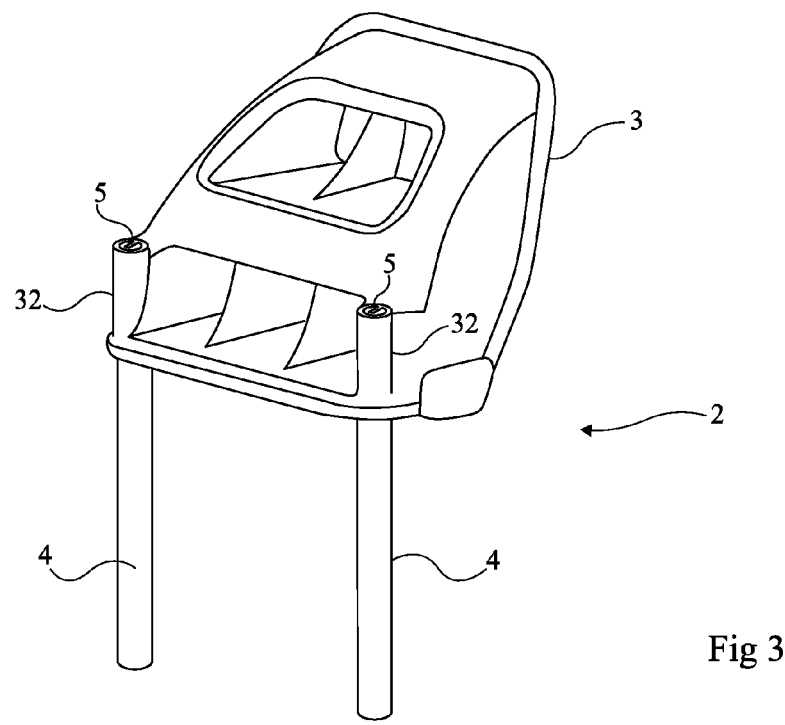
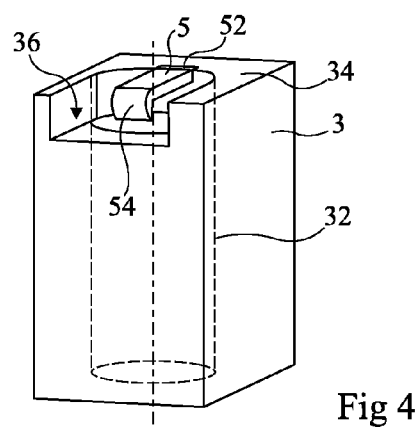
Fig 3
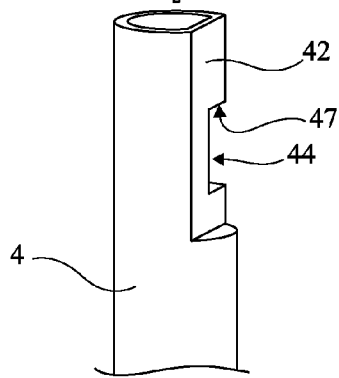
Fig 5
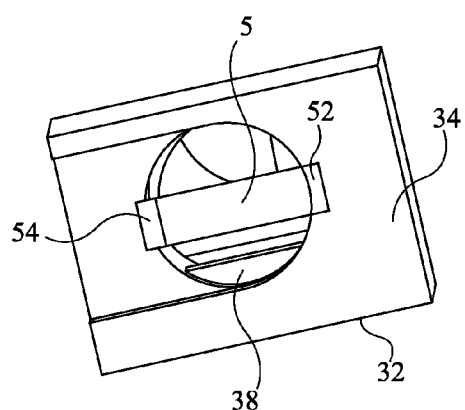
Fig 4
Fig 6

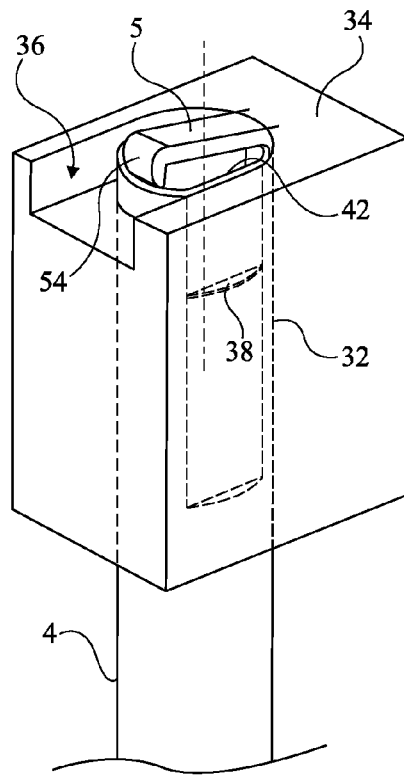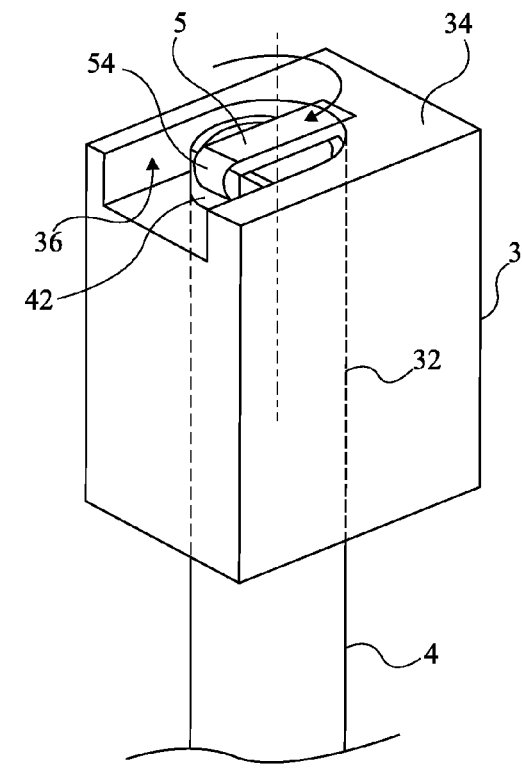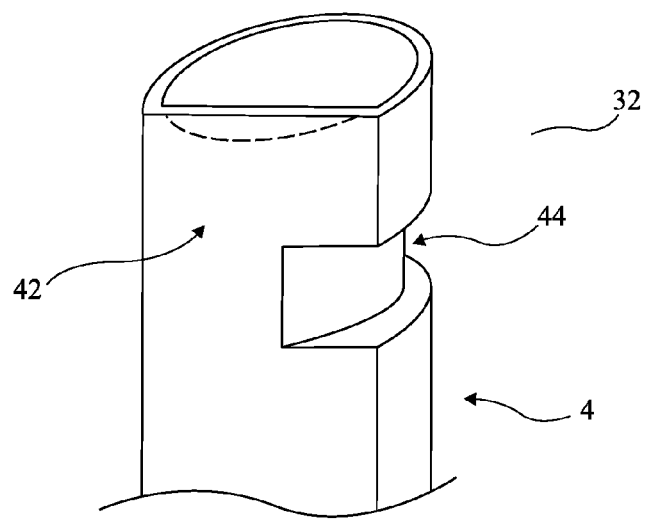

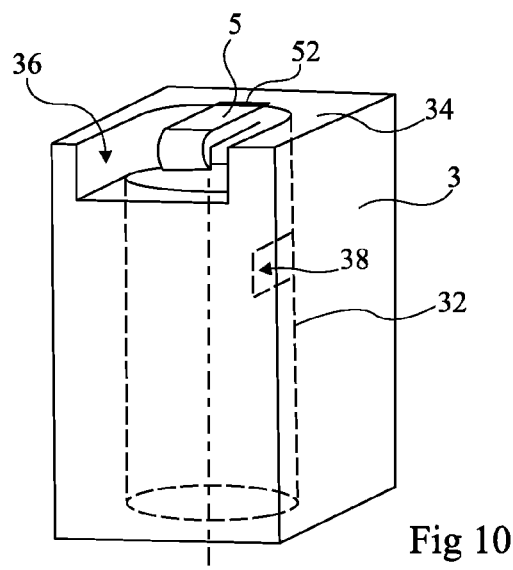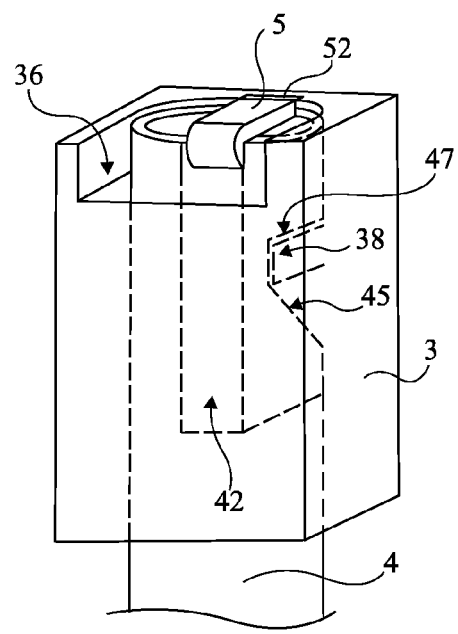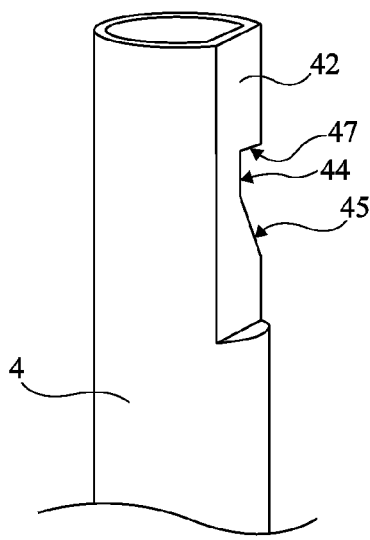
Fig 10
Fig 12
Fig 11

HEADREST FOR MOTOR VEHICLE SEAT

BACKGROUND OF THE INVENTION

1. Field of the Invention

The present invention generally relates to motor vehicle seats and, more specifically, to the forming of a headrest for such seats.

2. Discussion of Prior Art

Different types of headrests for motor vehicle seats are known. Two types of headrests can be mentioned, those integrating an adjustment mechanism and simpler ones for which the position of a body of the headrest with respect to spindles engaged in the backrest of the seat is fixed. In the first category, the spindles generally form the two branches of a U having its base fastened to a frame of the headrest. In the second category, to which the present invention more specifically applies, the spindles are formed of metal rods which are individually connected to the headrest frame. The body or frame of the headrest then more and more often is a plastic frame or case having sleeves into which the spindles are engaged. In all cases, the frame is subsequently covered with upholstery (cushioning and cover).

FIG. 1 very schematically shows a lateral view of a motor vehicle seat 1 of the type to which the present invention applies as an example. This seat comprises a seat bottom piece 12 on which is hinged a backrest 14. The seat bottom piece is fastened to floor P of the vehicle, directly or via a guide rail mechanism 16. Backrest 14 supports a headrest 2 formed of a body 3 and of spindles 4 having their free ends engaged in sleeves provided for this purpose in the high portion of backrest 14.

FIG. 2 is a rear perspective view of a usual headrest 2' of the type having separate spindles 4'. The upper end of each spindle 4' is engaged in a sleeve 32' defined by head 3' of headrest 2'. The ends of the spindles comprise holes intended to receive locking pins 42' transversely engaged through sleeves 32' and cooperating with grooves provided in the spindles. These pins are force-fit to block each spindle with respect to body 3'.

A disadvantage of such an assembly is that it requires for an operator to force fit the two locking pins. Further, for security reasons, it is necessary to verify that the headrest is properly assembled. With this assembly principle, it must be attempted to force the separation of the spindle from the headrest to verify that it is properly fastened. A disadvantage is that in case of an incorrect fastening, the plastic frame is damaged and can no longer be used.

It would be desirable to simplify the assembly of spindles in a headrest of plastic-body type.

It would further be desirable to be able to easily verify that the headrest has been properly assembled.

Document EP-A-0743223 describes a headrest structure for a motor vehicle. The upper ends of the spindles of the headrests intended to be engaged into the housings of a body of the headrest comprise, on the one hand, a vertical rib cooperating with a vertical groove of the housing to guide the spindle while it is being introduced and, on the other hand, a horizontal rib cooperating with a horizontal tooth of the housing to block the translation of the spindle. Two different means are thus necessary on the spindle side and on the housing side, respectively for the guiding and to block the translation.

SUMMARY OF THE INVENTION

An object of an embodiment of the present invention is to provide a system for assembling spindles in the body of a headrest, which overcomes all or part of the disadvantages of conventional systems.

An object of another embodiment of the present invention is to avoid the use of force-fit pins to lock the spindles in the headrest body.

An object of another embodiment of the present invention is to provide a system in which an incorrect assembly can be easily detected.

To achieve all or part of these and other objects, the present invention provides a headrest for a motor vehicle seat, comprising:

at least one spindle for assembling the headrest with a backrest of the seat; and a body provided with at least one housing in the shape of a sleeve for receiving one end of said spindle, the spindle comprising, in an upper portion, a shoulder capable of cooperating with a horizontal rib, protruding inside of a housing of the body, to block any translation of the spindle in its housing.

According to an embodiment of the present invention, the spindle comprises, at least in said upper portion, a cut-off corner emerging at its upper end.

According to an embodiment of the present invention, said rib cooperates with the cut-off corner of the spindle to form a mistake proof guide of the engagement of the spindle into the housing.

According to an embodiment of the present invention, each housing is open at its two ends, a tab, free at one of its ends and resiliently deformable, partially closing the upper opening of each housing and ending in a nose capable of cooperating with the cut-off corner of the corresponding spindle to block any rotation thereof in its housing.

According to an embodiment of the present invention, an upper surface of said tab is flush, at rest, with an upper surface surrounding the housing and forms an element for detecting that a spindle is locked.

According to an embodiment of the present invention, the spindle comprises a vertical port capable of cooperating with a resiliently deformable tongue of the body.

According to an embodiment of the present invention, the shoulder is formed by the upper edge of a horizontal rib made in the upper portion of the spindle.

According to an embodiment of the present invention, the horizontal rib of the spindle comprises a slanted lower edge.

The present invention also provides a motor vehicle seat comprising such a headrest.

The present invention also provides a method for assembling such a headrest, comprising the steps of:

engaging the spindle into the body in a radial position where the cut-off corner faces the rib; and rotating the spindle until the rib is in contact with said shoulder.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 3 is a rear perspective view of an embodiment of a headrest according to an embodiment of the invention;

FIG. 4 is a perspective view of a body portion of the headrest of FIG. 3 defining a sleeve for receiving a spindle;

FIG. 5 is a perspective view of an upper portion of a spindle intended to be engaged into the sleeve of FIG. 4;

FIG. 6 is a simplified top view of the sleeve of FIG. 4;

FIG. 7 is a perspective view of a first step of assembly of the spindle of FIG. 5 into the sleeve of FIG. 4;

FIG. 8 is a perspective view of the spindle of FIG. 5 once locked in the sleeve of FIG. 4;

FIG. 9 is another perspective view of the upper portion of the spindle of FIG. 5;

FIG. 10 shows the same perspective view as FIG. 4;

FIG. 11 is a perspective view of another embodiment of an upper portion of a spindle intended to be engaged into the sleeve of FIG. 10;

FIG. 12 is a simplified perspective view of the rod of FIG. 11 once locked in the sleeve of FIG. 10;

DETAILED DESCRIPTION

Figure 1:
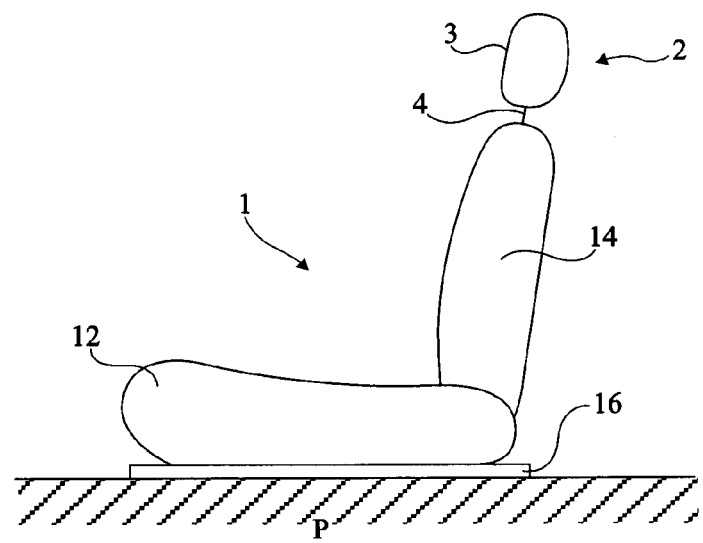
FIG. 1, previously described, is a lateral view of a motor vehicle seat of the type to which the present invention applies as an example.
Figure 2:
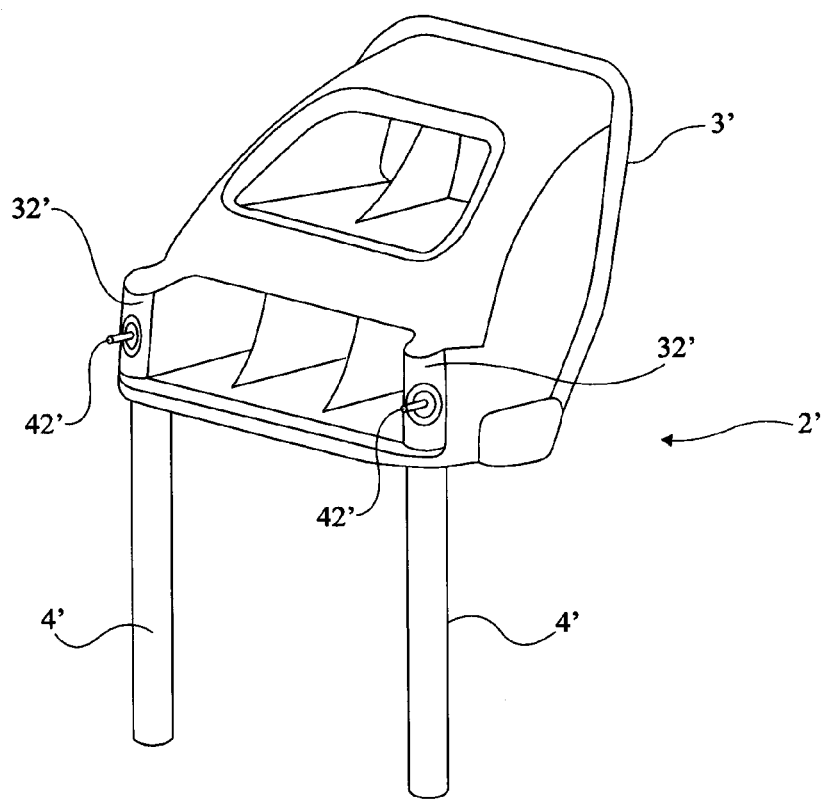
FIG. 2 is a rear perspective view of a conventional headrest frame.

The same elements have been designated with the same reference numerals in the different drawings. For clarity, only those elements which are useful to the understanding of the present invention have been shown and will be described. In particular, the manufacturing of the spindles and of the head for receiving them has not been detailed, the present invention being compatible with usual methods for manufacturing metal spindles and plastic frames or the same in other materials. Further, the upholstery of the headrest has not been detailed either, the present invention being here again compatible with upholsteries currently associated with such headrests.

Reference will be made to terms front, back, bottom, top, upper, lower, etc., considering a headrest in a normal position of installation on a vehicle seat (for example, such as illustrated in FIG. 1).

FIG. 3 is a rear perspective view of a headrest 2 according to an embodiment of the invention.

As previously, this headrest comprises a frame or body 3, for example, a plastic frame, and two identical spindles 4 intended to be engaged into sleeves or housings 32 made in head 3.

FIG. 4 is a perspective view of an embodiment of a portion of body 3 of the headrest of FIG. 3 at the level of a sleeve 32 for receiving a spindle.

FIG. 5 is a perspective view of an embodiment of an end of a spindle 4 intended to be engaged into sleeve 32 of FIG. 4.

FIG. 6 is a simplified top view of sleeve 32 of FIG. 4.

The present invention will be described hereafter in relation with a single spindle and a single housing, the mechanism being the same for the two headrest spindles and being applicable to a single-spindle headrest.

Sleeve 32 has a generally cylindrical shape open at its two ends with a generally circular cross-section. In its upper portion, the sleeve emerges into a groove or recess 36 of a substantially planar portion 34 of body 3.

Spindle 4 has a generally cylindrical shape of circular cross-section. It is contained within a diameter slightly smaller than the internal diameter of housing 32 to be able to engage therein. Spindle 4 comprises, in an upper portion and along a height preferably smaller than the height of housing 32, a cut-off corner 42. In other words, the section of the upper portion of the spindle is cut parallel to a diameter thereof.

In its upper portion, for example, approximately at mid-height of cut-off corner 42, the spindle comprises a horizontal groove 44. Groove 44 starts from cut-off corner 42 and extends along approximately one quarter of the spindle circumference. Groove 44 defines in its upper portion a shoulder 47 intended to cooperate with a horizontal rib 38 (FIG. 6), protruding from the inside of housing 32 to block any translation of the spindle. The position of cut-off corner 42 in the horizontal section of the spindle depends on the thickness of the rib in the horizontal section of the housing to enable the spindle to engage from the bottom and to pass rib 38.

Preferably, a horizontal tab or tongue 5 partially closes, preferably diametrically, the upper opening of sleeve 32. This tab is connected to body 3 by one of its ends 52 and is free in groove 36 at its other end. The free end of tab 5 comprises a downward-facing nose 54. The upper surface of tab 5 is flush, at rest, with upper portion 34 of the region of body 3 around the groove. The volume of tab 5 is thus contained within recess 36 as more specifically appears from FIG. 4. Tab 5 has a double function. On the one hand, its nose 54 takes part in the blocking of any rotation of spindle 4. On the other hand, its deformation is used as a detector of the proper positioning of the spindle.

Another function of cut-off corner 42 is to cooperate with nose 54 of tab 5 to block any rotation of tube 4. Thus, the length of tab 5 all the way to nose 54 is slightly greater than the partial diameter of spindle 4 on the direction tangent to cut-off corner 42 and running through the center of the spindle.

According to the position of rib 38 with respect to nose 54, groove 44 may thus be on one side or the other of cut-off corner 42.

FIG. 7 is a simplified perspective view illustrating the engagement of spindle 4 in its housing 32.

FIG. 8 is a simplified perspective view illustrating the locked position of spindle 4 in its housing 32.

FIG. 9 is a perspective view of spindle 4 on the side of cut-off corner 42.

As illustrated in FIG. 7, spindle 4 is engaged in tube 32 so that its cut-off corner 42 faces rib 38. These two elements then behave as a mistake proof guide forcing the operator to engage spindle 4 in a correct position. When the spindle comes into contact with tab 5, the continuation of the engagement of the spindle, associated with the fact that the cut-off corner does not face nose 54, deforms tab 5 upwards. Once arrived in this position, the operator rotates spindle 4 (for example, by one quarter of a turn, counterclockwise) to bring cut-off corner 42 in front of nose 54 and thus block any rotation of spindle 4. The external surface of cut-off corner 42 then cooperates with the internal surface of nose 54. As illustrated in FIG. 9, the rotation of tube 4 also causes a vertical locking of its position by engaging rib 38 into groove 44 of the tube. Thus, both the rotation and the translation of the tube are blocked. Rib 38 is used, on the housing side, both to guide the spindle while it is being engaged, by cooperating with cut-off corner 42, and to block any translation thereof, by cooperating with groove 44.

According to the shown embodiment, tab 5 also behaves, during the engagement of the tube, as a vertical stop, the operator rotating the spindle after having slightly deformed tab 5. As a variation, especially to mechanically relieve tab 5, an additional vertical stop may be provided, for example, in the form of a rib protruding from recess 36.

As appears from FIG. 7, as long as the spindle has not been rotated to be blocked, tab 5 is slightly deformed upwards and thus protrudes from upper surface 34 of the housing. It is thus particularly easy to detect an incorrect assembly. Such a detection may be performed visually by an operator or by automated means, for example, a light beam which, if interrupted by tab 5, indicates an incorrect assembly.

In the position of FIGS. 8 and 9, when the tab has come back down, this necessarily means that spindle 4 has been turned in the right direction and thus can no longer either rotate or move vertically.

Spindles 4 may be made of metal, of plastic, or of a composite, and are preferably tubular. Head 3 is generally made of injected plastic (for example, expanded polypropylene). A single spindle supporting the headrest may be used.

The height of cut-off corner 42 of spindle 4 is at least equal to the distance between the high opening of housing 32 and rib 38. Preferably, this height is at most equal to the height of the housing so that, once the spindle has been assembled, its visible portion is circular.

According to a preferred embodiment, tab or clip 5 is solid with head 3, which is made of molded plastic. As a variation, tab 5 may be an insert made of a different material, for example, force fit by its end 52 into a horizontal hole of the head at the level of recess 36.

The above-described spindle assembly system is particularly simple to implement. It is further easy to detect an incorrect assembly, be it manually or by automated means.

FIGS. 10 to 12 show another embodiment of a groove 44 of the rod capable of cooperating with body 3. These drawings should be compared with FIGS. 4 and 5 and show, respectively, body 3, rod 4, and these two elements assembled. As compared with the embodiment of FIG. 5, groove 44 comprises, at least in its low portion, no ridge or raw edge, but joins the section of greatest diameter of the rod by a slanted surface 45. Once assembled (FIG. 12), rib 38 cooperates with shoulder 47 of groove 44. Such an embodiment is compatible with the use, as a vertical lock, of the slanted-edge grooves currently used to adjust the height of the headrest.

Figure 13:
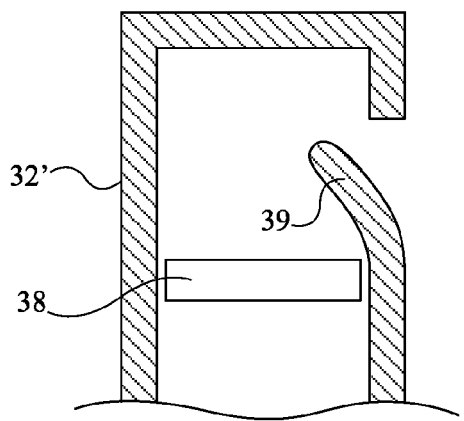
FIG. 13 is a cross-section view of another embodiment of a sleeve for receiving a spindle.

FIG. 13 is a perspective view of another embodiment of a portion of body 3 of the headrest of FIG. 3 at the level of a sleeve 32' for receiving a spindle.

Figure 14:
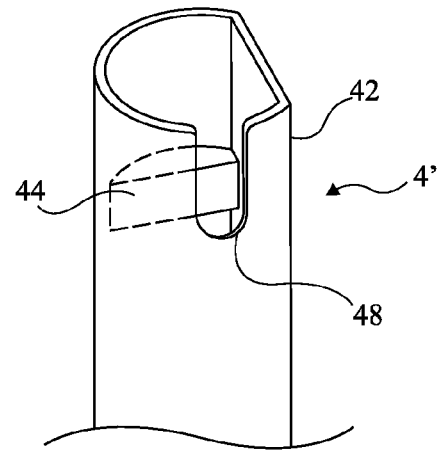
FIG. 14 is a perspective view of another embodiment of an upper portion of a spindle intended to be engaged into the sleeve of FIG. 13.

FIG. 14 is a perspective view of another embodiment of an end of a spindle 4' intended to be engaged into sleeve 32' of FIG. 13.

As compared with the previous embodiments, spindle 4' comprises a vertical port 48, for example, emerging at its upper end. Sleeve 32 comprises, in the vicinity of its upper end (for example, blind), a tongue 39 intended to cooperate with port 48 of spindle 4'. Tongue 39 is capable of resiliently deforming, its rest position being inside of the sleeve, as illustrated in FIG. 13.

The other elements (cut-off corner, groove, rib) are not modified with respect to the other embodiments.

When it is engaged into sleeve 32', the external wall of spindle 4' presses tongue 39 and deforms it towards the outside. Once spindle 4' abuts against the bottom of sleeve 32', its rotation (for example, by one quarter turn) places port 48 in front of tongue 39 which resiliently enters into port 48. Any rotation of spindle 4' is then blocked. To block its translation, like for the other embodiments, rib 38 cooperates with shoulder 47 of the spindle. Tongue 39 is obtained by molding, on manufacturing of body 3, or is an insert.

Tongue 39 may comprise an external bump (not shown) forming an element of detection of an incorrect assembly, this bump protruding from the external surface of sleeve 32' as long as the tongue is not engaged into port 48.

Various embodiments have been described, various alterations and modifications will occur to those skilled in the art. In particular, the practical implementation of the present invention is within the abilities of those skilled in the art based on the functional description given hereabove by using materials and tools currently used in the manufacturing of headrests. Further, the relative dimensions and positions of the various elements (grooves 44, ribs 38, tabs 5, cut-off corners 42, etc.) are within the abilities of those skilled in the art based on the indications relative to the mutual cooperation of these elements.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A headrest for a motor vehicle seat, comprising:
   at least one spindle for assembling the headrest with a backrest of the seat and comprising, in an upper portion, a shoulder and, at least in this upper portion, a cut-off corner emerging at an upper end of the spindle; and
   a body provided with at least one housing in the shape of a sleeve for receiving the upper end of the spindle, said housing comprising a horizontal rib, fixedly protruding inside of the housing and not extending to an upper end of the housing or a lower end of the housing, and wherein the housing is open at its two ends, a tab free at one of its ends and resiliently deformable, partially closing the upper opening of each housing and ending in a nose capable of cooperating with the cut-off corner of the corresponding spindle to block any rotation thereof in its housing,
   said horizontal rib cooperating with said shoulder to block any translation of the spindle out of the housing and with said cut-off corner to form a mistake proof guide for the engagement of the spindle into the housing.

2. The headrest of claim 1, wherein an upper surface of said tab is flush, at rest, with an upper surface surrounding the housing and forms an element for detecting that a spindle is locked.

3. The headrest of claim 1, wherein the spindle comprises a vertical port capable of cooperating with a resiliently deformable tongue of the body.

4. The headrest of claim 1, wherein the shoulder is formed by the upper edge of a horizontal groove made in the upper portion of the spindle.

5. The headrest of claim 4, wherein the horizontal groove of the spindle comprises a slanted lower edge.

6. An automobile vehicle seat comprising the headrest of claim 1.

7. A method for assembling the headrest of claim 1, comprising the steps of:
   engaging the spindle into the body in a radial position where the cut-off corner faces the rib; and
   rotating the spindle until the rib is in contact with said shoulder.

* * * * *